US011636376B2

(12) United States Patent
Ezen Can et al.

(10) Patent No.: US 11,636,376 B2
(45) Date of Patent: Apr. 25, 2023

(54) ACTIVE LEARNING FOR CONCEPT DISAMBIGUATION

(71) Applicant: INTERNATIONAL BUSINESS MACHINES CORPORATION, Armonk, NY (US)

(72) Inventors: Aysu Ezen Can, Cary, NC (US); Corville O. Allen, Morrisville, NC (US); Roberto Delima, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 15/996,491

(22) Filed: Jun. 3, 2018

(65) Prior Publication Data
US 2019/0370696 A1 Dec. 5, 2019

(51) Int. Cl.
*G06N 20/00* (2019.01)
*G06F 40/40* (2020.01)

(52) U.S. Cl.
CPC ............. *G06N 20/00* (2019.01); *G06F 40/40* (2020.01)

(58) Field of Classification Search
CPC .................................. G06N 20/00; G06F 40/40
See application file for complete search history.

(56) References Cited

U.S. PATENT DOCUMENTS

| 7,702,690 | B2 | 4/2010 | Brave et al. | |
| 9,535,902 | B1* | 1/2017 | Michalak | G06F 16/3331 |
| 2014/0330594 | A1* | 11/2014 | Roberts | G06Q 40/08 705/4 |
| 2015/0178270 | A1 | 6/2015 | Zuev et al. | |
| 2015/0370782 | A1* | 12/2015 | Fan | G06F 40/30 704/9 |
| 2016/0098645 | A1* | 4/2016 | Sharma | G06N 20/00 706/12 |
| 2017/0039186 | A1 | 2/2017 | Pestian et al. | |
| 2017/0330105 | A1* | 11/2017 | Lindsley | G06F 16/9024 |
| 2018/0032901 | A1* | 2/2018 | Chowdhury | G06N 20/10 |
| 2018/0068222 | A1* | 3/2018 | Brennan | G06N 5/022 |
| 2018/0336481 | A1* | 11/2018 | Guttmann | G06N 5/022 |
| 2019/0354544 | A1* | 11/2019 | Hertz | G06N 20/10 |

OTHER PUBLICATIONS

Savkov, Aleksandar, John Carroll, Rob Koeling, and Jackie Cassell. "Annotating patient clinical records with syntactic chunks and named entities: the Harvey Corpus." Language resources and evaluation 50, No. 3 (2016): 523-548. (Year: 2016).*

(Continued)

*Primary Examiner* — Casey R. Garner
(74) *Attorney, Agent, or Firm* — Steven M. Bouknight (57) ABSTRACT

A method, computer system, and a computer program product for active machine learning is provided. The present invention may include annotating a plurality of data entries. The present invention may also include building a first dataset based on the annotated plurality of data entries. The present invention may then include receiving user feedback based on the built first dataset. The present invention may further include assigning a plurality of weights to a plurality of data entry subsets. The present invention may also include generating a second weighted dataset based on the received user feedback.

20 Claims, 7 Drawing Sheets

(56) References Cited

OTHER PUBLICATIONS

Weng, Wei-Hung, Kavishwar B. Wagholikar, Alexa T. McCray, Peter Szolovits, and Henry C. Chueh. "Medical subdomain classification of clinical notes using a machine learning-based natural language processing approach." BMC medical informatics and decision making 17, No. 1 (2017): 1-13. (Year: 2017).*

Mell et al., "The NIST Definition of Cloud Computing", National Institute of Standards and Technology, Special Publication 800-145, Sep. 2011, pp. 1-7.

He et al., "Learning from Imbalanced Data", IEEE Transactions on Knowledge and Data Engineering, vol. 21, No. 9, Sep. 2009, pp. 1263-1284.

McCallum et al., "Employing EM in Pool-Based Active Learning for Text Classification", Submitted Mar. 1998 to the 15th International Conference on Machine Learning (ICML-98), pp. 1-16.

\* cited by examiner

ACTIVE LEARNING FOR CONCEPT DISAMBIGUATION

BACKGROUND

The present invention relates generally to the field of computing, and more particularly to machine learning. Unsupervised machine learning may collect and model data to form a structure using the collected data. Supervised machine learning may use a labeled training set to build a model that imitates behavior in the ground truth. Subject matter experts (SMEs) may provide input into a supervised machine learning model by altering the training set as opposed to an unsupervised machine learning environment, when a SME may not add input to the data.

SUMMARY

Embodiments of the present invention disclose a method, computer system, and a computer program product for active machine learning. The present invention may include annotating a plurality of data entries. The present invention may also include building a first dataset based on the annotated plurality of data entries. The present invention may then include receiving user feedback based on the built first dataset. The present invention may further include assigning a plurality of weights to a plurality of data entry subsets. The present invention may also include generating a second weighted dataset based on the received user feedback.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for active machine learning. As such, the present embodiment has the capacity to improve the technical field of active machine learning by creating an active learning framework that includes a hybrid approach to use rule-based natural language processing (NLP) and machine learning as SME feedback is provided to generate ground truth. More specifically, ground truth is provided by a SME which generates a labeled dataset using active learning. The SME input will be weighted higher than the dataset provided by NLP and the machine learning will become more accurate as the datasets are corrected by the SME.

As previously described, unsupervised machine learning may collect and model data to form a structure using the collected data. Supervised machine learning may use a training set (i.e., labeled training set, training dataset or training data) to build a model that imitates behavior in the ground truth. Ground truth may represent the accuracy of data by the classification of data or data labels (i.e., labeled dataset). A model may be built using one or more datasets and a training dataset may train the model.

A term (e.g., a word) may refer to multiple potential meanings and importance in a context being utilized and the term may need to be disambiguated to the true meaning of the term in the context of the best use of the term. The best fitting candidate concept from the possible values or concepts may be chosen to yield positive results. Then, building ground truth for concept disambiguation may be employed using a feedback method based on a SME input.

Subject matter experts (SMEs) may provide input into a supervised machine learning model by altering the training set as opposed to an unsupervised machine learning environment, when a SME may not add input to the data. Supervised machine learning may allow an individual (e.g., a user, a SME, an administrator or a doctor) to have some control over the machine learning model by having the ability to validate, alter, update or change the training set. The training set of data may include parameters of a classifier or a label for learning purposes, such as a tumor size or weight and a supervised machine learning environment may allow a SME to update the training set based on SME experience and facts (i.e., evidence).

Manually annotating large amounts of data may be time-intensive and complex, for example, in a medical domain (i.e., a domain specific logic). The number of classes that need annotation may require more than simple Boolean classifications, such as other entities in the free-form text that may need to be extracted and correctly predicted. A free-form text example in a medical domain may include tumor measurements. Heuristics may be used for disambiguating measurements and may allow the measurement results to be extracted within a reasonable time frame (i.e., quicker than classical methods). Disambiguating measurements, for example, may use disambiguation (i.e., concept-based disambiguation, concept disambiguation or word-sense disambiguation) to analyze large data sets in a medical repository (i.e., database or corpus).

Disambiguation may include multiple versions of a similar concept within a parse that may be used in executing an algorithm. Once disambiguation is required, then active learning may be used based on the feedback of a SME and the relation and input provided by the SME to build a combination of a classification, feature dependent and weighted learning system that may generate weighted ground truth for active learning. Using natural language processing (NLP) data and SME feedback, an active learning ground truth may be generated, which may be used to disambiguate between similar concepts of choice in a given text span.

Disambiguation may include a process of identifying (e.g., via NLP and semantic analysis) a meaning and classification for a word or a term when the word may have more than one meaning. For example, disambiguating a word may be accomplished by an individual using real-world evidence or by using machine learning. Machine learning may use NLP when receiving data to build a training set or a machine learning model. The received data may include both structured data and unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. The received data may be processed through NLP to extract meaningful information, for example, based on a particular field or industry. Semantic analysis may be used to infer the complexity of interactions, such as the meaning and intent of the language, both verbal and non-verbal (e.g., a user's spoken word captured on a microphone or a user's type written words). Semantic analysis may consider syntactic structures at various levels to infer meaning to a user's words, phrases or sentences.

Solely using proximity-based rules may not be scalable or easy to maintain, resulting in a trade-off between accuracy and time. A proximity-based rule may, for example, require multiple relevant word mentions since the diversity of language may hold multiple different permutations of rules to cover a given detection task, making a large-scale model impractical to create. NLP modelers may decide to either find a SME to create a labeled data set for supervised machine learning algorithms or to write proximity-based rules that may not be as accurate as a machine learning counterpart. Therefore, it may be advantageous to, among other things, create an active learning framework that may be used to generate ground truth for disambiguating concepts. The active learning phase may include receiving dynamic feedback from a user (e.g., SME or doctor) about the real-world findings or evidence to propagate machine learning with ground truth as each user provides feedback.

According to at least one embodiment, a machine learning model may generate ground truth (i.e., an updated labeled dataset providing more accuracy than a NLP labeled dataset) based on data obtained from user feedback. The ground truth may be generated for disambiguating concepts. The machine learning framework may include an evolving machine learning system that may begin with building rules from data that is available (i.e., no ground truth) and the system may become more accurate by building the labeled dataset on the fly (e.g., a doctor entering patient evidence into the dataset). Dialog-based feedback may include feedback from a user, for example, a doctor entering real-life data (i.e., evidence-based data) on a work computer, either verbally on a microphone or manually by type written words, that is executing an active learning program application at a hospital after examining a patient's tumor size. Alternatively, a labeled dataset may be used to initially train the machine learning model for text classification and further enlarge the dataset by using active learning (e.g., SME input or feedback).

Generating ground truth using active learning may improve complex NLP tasks, such as entity detection (i.e., entity recognition, entity extraction or named entity recognition) and coreference resolution. Entity detection may detect and classify named entities into a category, such as a person, a size, a quantity, a measurement, a location or a percentage. A coreference resolution may be a higher level NLP process that detects expressions (i.e., words) in a phrase, sentence or paragraph that refer to the same entity. Generating and obtaining ground truth may be a labor intensive task, therefore, creating the active learning model that utilizes NLP to assist a user in generating ground truth may create a less burdensome task for users (e.g., SMEs) and may create more accurate machine learning protocols.

An existing rule-based NLP may be used to initially annotate entities. For example, a medical facility uses NLP to annotate entities in patient records stored on the medical facility database. Using an assumption that the entities are correct, a dataset may be built where each row may represent one annotation. For example, a tumor measurement and other useful features that explain the medical evidence are used for machine learning. After the dataset is built, feedback may be provided by a user regarding the correctness of the entities found during the building of the dataset. For example, a doctor or a SME provides feedback, via verbal dialog or type written dialog, validating, amending or correcting the entities found after an appointment with a patient and gathering real-world data or evidence, such as a measurement.

Each correction, validation or amendment made by the user may be added to the built dataset with higher weights (i.e., higher accuracy) than the dataset created by NLP. The user feedback may be considered a higher weight than the NLP created dataset since the user is basing the feedback entry on real-world evidence (e.g., a doctor measuring a patient's tumor size). The user feedback may generate a more accurate labeled dataset (i.e., ground truth) by using active learning and without requiring a user (e.g., a SME or a doctor) to manually annotate large sets of data. When a user provides feedback or a correction based on real-world evidence via dialog to the dataset, the data may become ground truth.

The active learning program may generate a labeled dataset based on data stored in a database and train the model using an existing rule-based NLP model, then a user (e.g., a SME) may use the active learning program to provide evidence. A user's interaction with the active learning program may provide a correction, for example, if the user disagrees with the NLP built dataset. The interaction may allow the user to agree or disagree with the data and may allow the user to choose a correct answer. The process of user interaction may determine the feedback loop for further training and further refining the labeled dataset.

A disambiguating measurement example for the active learning program application may begin with a doctor meeting with a patient who has a tumor. The doctor obtains the patient medical history via electronic medical records (EMRs) to prepare for the appointment. The EMRs were stored in the medical center patient database as both structured and unstructured data from the patient's record. Next, NLP tasks are executed using the patient's record, such as coreference resolution, entity detection, hypothetical clauses and anaphora resolution algorithms. Attributes are then derived for the NLP output using a medical logic module (MLM) (i.e., a healthcare knowledge base). A summary of the information provided by NLP tasks and the medical logic module may be presented.

The choice of presentation may be implemented by rules based on the entities and features found in the initial analysis and NLP task output. The initial analysis and NLP output may provide the number of features and the type of features found in the initial sentence parse, the similarity of the features and concepts, the number of potential values that may be assigned to a concept and the parsing scores related to the attributes and entities. The parsing scores may include parse tree (e.g., NLP parse tree) characteristics and as well as confidence in a tag associated with an entity. The rules-based logic may select a set of items based on the summarization of NLP and MLM.

The disambiguating measurement example may begin with dialog between a user and, for example, IBM Watson® (IBM Watson and all IBM Watson-based trademarks and logos are trademarks or registered trademarks of International Business Machines Corporation and/or its affiliates), and may incorporate a question-answer (QA) session as follows:

| | |
|---|---|
| Summarization of NLP and MLM | Based on the 5 cm tumor size found in the lung, there are 2 metastatic sites found |
| User | Why do you think 5 cm is the morst preferred tumor size? |
| IBM Watson ® | I found 4 tumor measurements in the case, 5 cm was the one that was in the primary tumor site, had the most recent date and was the largest (given from or derived from the trail). |
| User | There is a tumor size you missed, the one that is the lung. |
| IBM Watson ® | The one that measured 7 cm? |
| User | Yes |
| IBM Watson ® | Got it. |
| Next, the while pipeline is ran again using the new measurement of 7 cm. | |
| IBM Watson ® | With the information you provided, I found that 7 cm is the most preferred tumor size. Is that correct? |
| User | Yes, it is. |

Using the above example, a table using generated NLP rules (i.e., NLP rules based logic) without ground truth compared to using the generated NLP rules with ground truth is provided below. A rule within an active feedback module may utilize the proximity of entities and each proximity of entity measurement. A rule within the active feedback module may also utilize the number of measurement types to initiate a feedback input with the user. A rule may utilize a missed annotation for a term in a sentence to initiate a feedback input with the user or the rule may utilize the parse score for a sentence with terms that are critical to the medical logic.

| Entity (Size) | Classification | Source |
|---|---|---|
| NLP and No Ground Truth | | |
| 3 cm Lesion | Tumor Measurement | NLP |
| Nodes Measuring 5 cm | Lymph Node | NLP |
| NLP and using Ground Truth | | |
| Tumor Approximately Measured at 7 cm | Tumor Measurement | User |

The entries containing the user as a source may be weighted higher than the entries provided by the NLP as a source since the user is providing the ground truth. The associated terms utilized by the user and the relationships specified by the user found in the initial text may add weights to a relationship or specific feature found based on the input dialog. For example, the tumor found in the lung puts a relationship on the location of the tumor being weighted higher on the organ rather than the most recent date.

Utilizing training data obtained from both NLP and via active learning (i.e., user input), the active learning program may become more accurate as machine learning is used. Machine learning features may include the entity (i.e., ambiguous entity) to be classified (i.e., the concept to be disambiguated) and features of the concept to be disambiguated (e.g., units for measurements and filtering out values that don't make sense). Machine learning features may also include the entities in a sentence found by using NLP, the part of the speech tags of each token (i.e., text broken up into tokens where a token is a defined unit or piece of the text) in the sentence, the trigger (i.e., NLP trigger) that was used by NLP for classification (e.g., tumor versus nodes), the distance (i.e., trigger distance) between the trigger and the ambiguous concept and the entities between the trigger and the ambiguous concept or value. Machine learning features may further include the number of nodes needed to traverse between the trigger and the ambiguous concept in a parse tree (i.e., syntactic structure), the parent of the trigger node in the parse tree, the parent of the ambiguous concept in the parse tree and the section in which the ambiguous concept is in.

An alternate embodiment may include not requiring a labeled dataset initially using NLP to build and train the machine learning model. Beginning the machine learning process from scratch, with no labeled data, may incorporate dialog-based feedback to generate a labeled corpus. An initial labeled dataset may begin with ground truth input from a user. For example, a SME's real-world evidence may be provided to an active learning program to begin building the labeled dataset based on the field of entry, such as the medical field, finance, business, shipping, agriculture or government. The entries, for example, from a medical facility may be accumulated by the doctors appointments throughout the facility and the entries may begin the active machine learning process, may continually be updated and refined and may provide ground truth as the machine learning process.

The alternate embodiment may retain the same benefits, such as building the dataset based on the user feedback which creates a machine learning environment that continuously becomes more accurate based on data entries. The alternate embodiment may also generate ground truth based on feedback using active learning as utilized as opposed to having a user annotate a large corpus of data.

Figure 1:
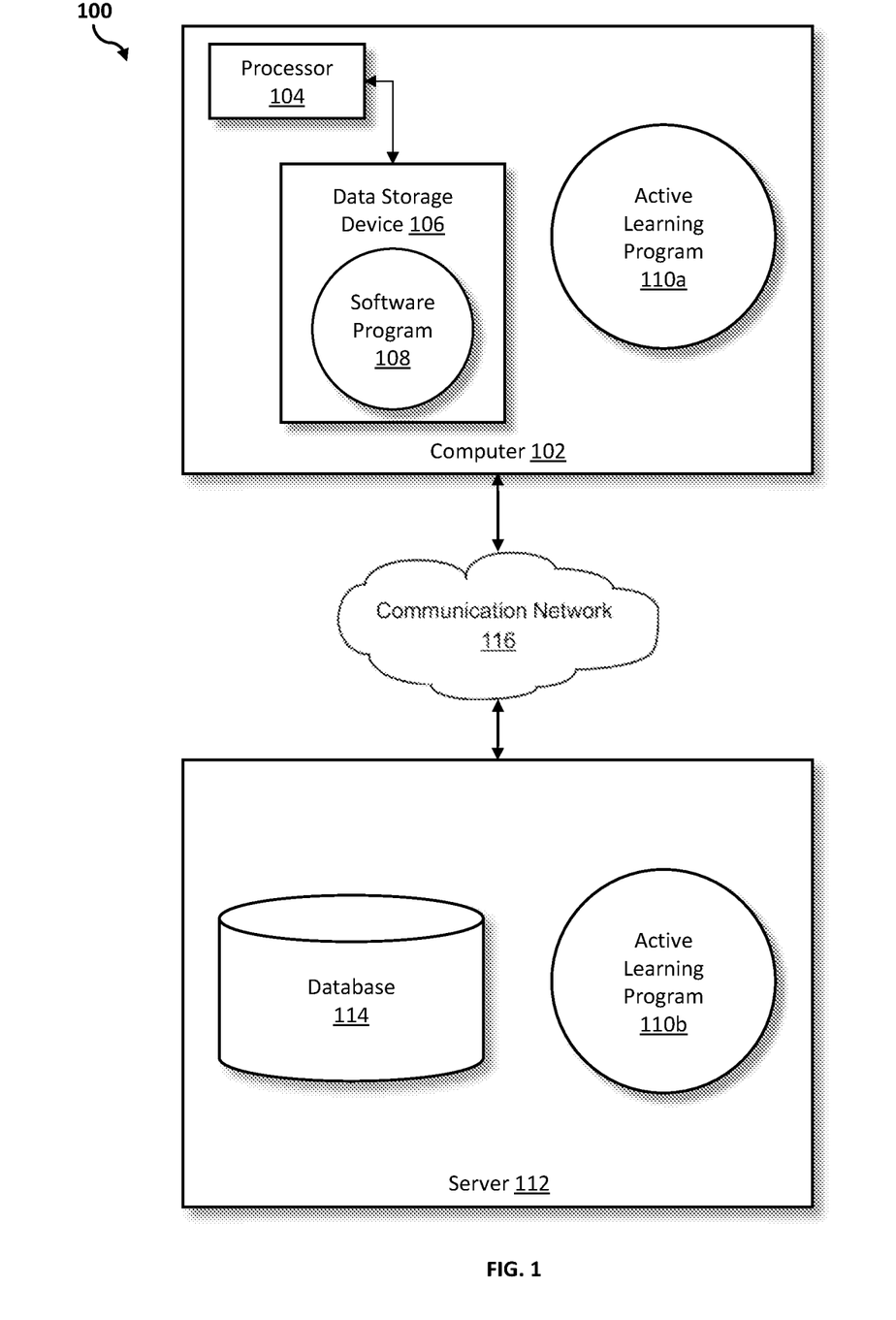
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an active learning program 110a. The networked computer environment 100 may also include a server 112 that is enabled to run an active learning program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the active learning program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the active learning program 110a, 110b (respectively) to build a dataset based on machine learning and user feedback. The active machine learning method is explained in more detail below with respect to FIGS. 2-4.

Figure 2:
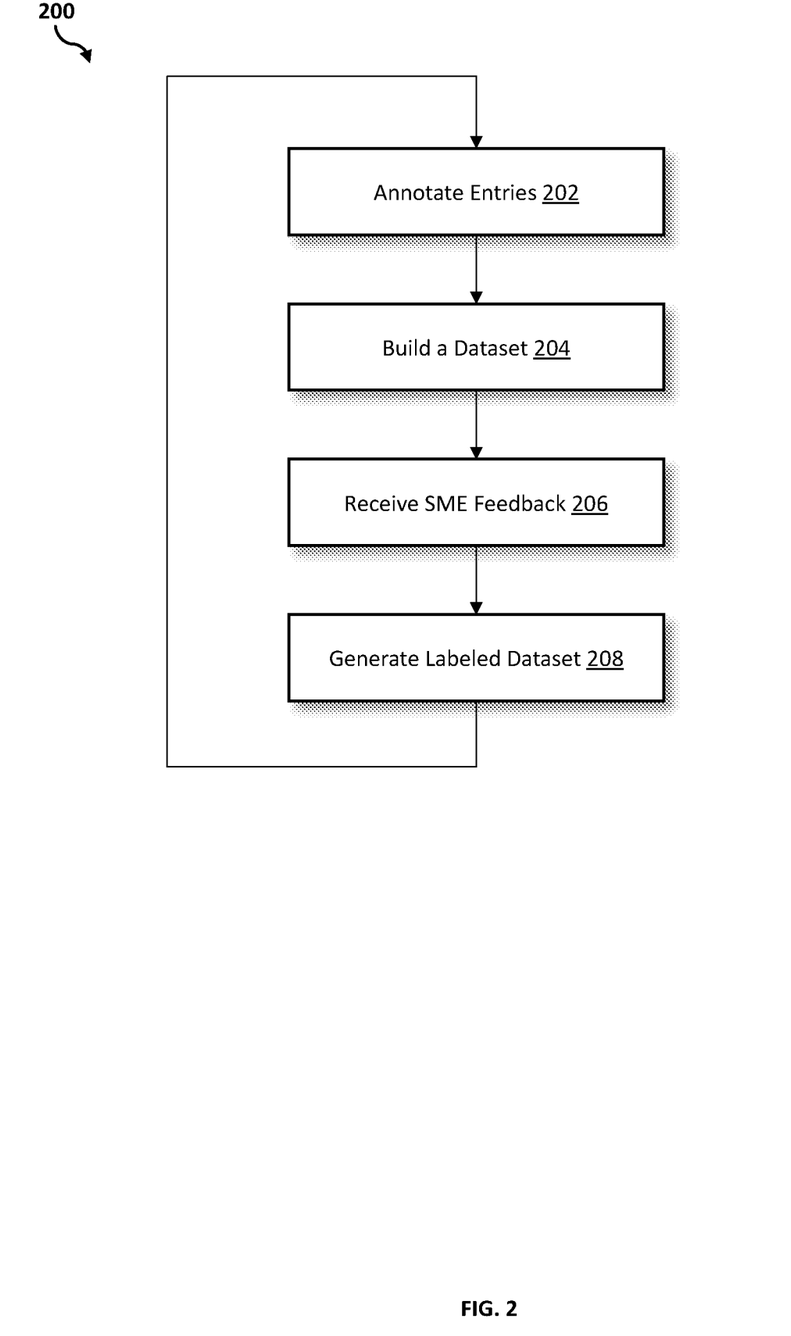
FIG. 2 is an operational flowchart illustrating a process for active machine learning according to at least one embodiment.

Referring now to FIG. 2, an operational flowchart illustrating the exemplary active machine learning process 200 used by the active learning program 110a, 110b according to at least one embodiment is depicted.

At 202, entries are annotated. Data entered into ML may derive from a source (e.g., database, corpus, knowledgebase or an individual). Machine learning may use NLP when obtaining or receiving data to build a training model. Annotating entries may include annotating the data obtained for building the training model by, for example, bootstrap aggregating for data accuracy. Annotating entries may create a machine learning model for a particular industry of field, such as the medical, finance, business, shipping, agriculture or government.

For example, a hospital is implementing machine learning to better service clients (i.e., patients). The hospital administrator then allows access to the patient repository so the data in patient files may be used internally at the facility to build a training model using the active learning program 110a, 110b. The hospital may use IBM Watson® Knowledge Studio (IBM Watson Knowledge Studio and all IBM Watson Knowledge Studio-based trademarks and logos are trademarks or registered trademarks of International Business Machines Corporation and/or its affiliates) to build the training model based on medical files. NLP may analyze data from the patient's medical record, such as an emergency medical record (EMR). NLP may extract entities that are specific to the hospital patients using semantic analysis.

Then, at 204, a dataset is built. The dataset may include a labeled dataset based on NLP, based on user entries or based on both NLP and user entries. If a user has not yet corresponded with the active learning program 110a, 110b, then the labeled dataset may be based solely on NLP (i.e., contain no ground truth). If the user has corresponded with the active learning program 110a, 110b before NLP has been implemented, then the labeled dataset may include only ground truth. Finally, if the user has corresponded with the active learning program 110a, 110b after NLP has been implemented, then the labeled dataset may include both an NLP dataset mixed with a heavier weighted dataset based on ground truth.

Continuing from the previous example, suppose the dataset is built based on NLP only, patient record data may have been collected and filtered into a dataset using coreference resolution and entity analysis. The built dataset may be available to the doctor, however, ground truth has not yet been implemented.

Next, at 206, SME feedback is received. A SME may include a user operating the active learning program 110a, 110b. The user feedback may be via verbal dialog or type written dialog, for example, on the user computing device, smart phone or tablet. The user, when providing feedback, may validate, amend or correct the dataset. The dataset may be altered based on harvesting real-world data or evidence based on the user experience. When a user provides feedback to the active learning program 110a, 110b, the user is disambiguating which answer is correct and entering the correct answer into the dataset. When a user validates or amends the dataset, the user entry is weighted higher than the NLP based entries since the user has examined the data in a real-world environment.

Continuing from the previous example, the NLP dataset has harvested 20 different tumor measurements prior to the doctor meeting with a patient. The active learning program 110a, 110b will cognitively make an assessment of which tumor measurement out of the 20 provided by NLP is correct. When the doctor then meets with the patient and measures the tumor size, the doctor will either validate or correct the tumor measurement provided. The doctor will validate or correct the tumor measurement based on evidence obtained during the doctor appointment with the patient.

At 208, a labeled dataset is generated. The generated labeled dataset may be based on user feedback into the active learning program 110a, 110b. The user feedback may be the ground truth added to the active learning program 110a, 110b. The ground truth provides the active learning program 110a, 110b with the real-world evidence to propagate a more robust machine learning environment that may continually increase the knowledge base by continually adding more real-world evidence by a SME. The feedback loop may then begin again at step 202.

Continuing from the previous example, once the doctor has validated or corrected the tumor measurement, the validated or corrected data is now considered ground truth with a labeled dataset that has a higher weight of accuracy associated with the labeled dataset than the NLP only dataset that did not contain ground truth.

Figure 3:
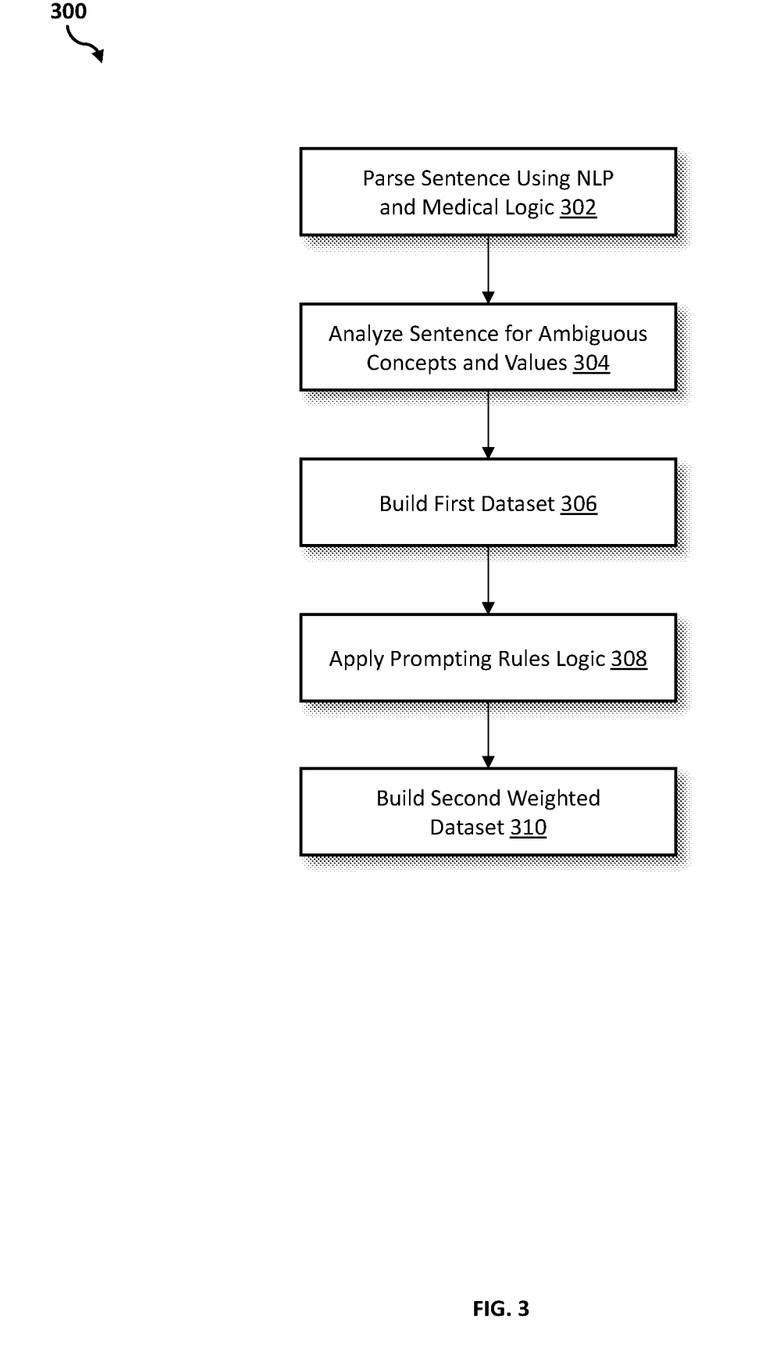
FIG. 3 is an operational flowchart illustrating a medical example of a process for active machine learning according to at least one embodiment.

Referring now to FIG. 3, an operational flowchart illustrating a medical example of an active machine learning process 300 used by the active learning program 110a, 110b according to at least one embodiment is depicted.

At 302, a sentence is parsed using NLP and medical logic. Medical logic may include a medical logic module (MLM) that stores healthcare knowledge, for example, on a hospital database. The MLM may provide published documentation regarding, for example, the treatment for a patient with a tumor. Medical data may also be parsed using NLP from, for example, a hospital database, knowledgebase or corpus that stores patient files, treatments, medical knowledge and doctor notes.

Then, at 304, the sentence is analyzed for ambiguous concepts and values. An ambiguous value may include a word with more than one meaning or interpretation. The sentence may also contain multiple ambiguous values. An ambiguous concept or phrase may include more than one word to mean a single concept (i.e., a saying), such as the phrase ache which could mean dull pain or yearning. Another example may include when the ambiguity deals with the values associated with an entity is a set of numbers found in the same sentence or paragraph as terms that usually have numbers associated with them.

For example, the numbers 5, 2, 7 and 3 may be found in a paragraph, some numbers are associated with a unit, such as centimeters, and the other numbers are not associated with a measurement. There may be an ambiguity to the type of number the non-measurement numbers (e.g., 5 and 2 are numbers measured in centimeters and 7 and 3 are not measurements) are in the paragraph, what characteristics the non-measurement numbers should have and the relationships between the non-measurement numbers, such as whether the number represents a tumor, a site or location or a weight. Ambiguity may hold various forms and can be created from a single word or the whole sentence. An example may include a doctor's notes stored on a hospital database for a patient that state "the ache is strong during this visit and is associated with the lung." Another example, the doctor's note states, "the first 2 are tumors, and the last is a lesion measured at 5."

At 306, a first dataset is built. The first dataset may include entities, features and classifications. Using the parsed and analyzed sentence, the dataset is built. For example, the sentence "the patient's tumor is 5 cm" may build a dataset with a size entity of 5 cm and a tumor measurement classification. The dataset may be built with large amounts of stored data, for example, data retrieved from a hospital database.

At 308, prompting rules logic is applied. The prompting rules logic may present choices for user (e.g., SME) feedback via type-written text on a computer 102 screen or via spoken conversation, for example, a doctor speaking into a microphone, on a computing device or via keyboard and mouse input by selecting a choice from a set of choices prompted on the computer screen.

Then, at 310, a second weighted dataset is built. Once SME feedback is provided, the second dataset is weighted based on the SME input. The second weighted dataset may be weighted or scored higher than a NLP created dataset (e.g., the first built dataset based on machine learning using NLP and a MLM). The second weighted dataset may be stored in a database or knowledge base (e.g., a hospital database) for future use, such as to be queried by a second user or build a new machine learning model. The weights in the data set may be applied to various features that correlate with the ambiguous concept based on the SME input. For example, the weights may apply to a proximity based term in the sentence, a particular part of speech for a term in the sentence or data type like a date or a measurement. The second user may, for example, include a nurse, doctor or hospital administrator. The second user may now benefit from the second weighted dataset that has SME feedback incorporated into the dataset by receiving a more accurate response based on the updated ground truth (i.e., second weighted dataset) and training of a subsequent machine learning model.

Figure 4:
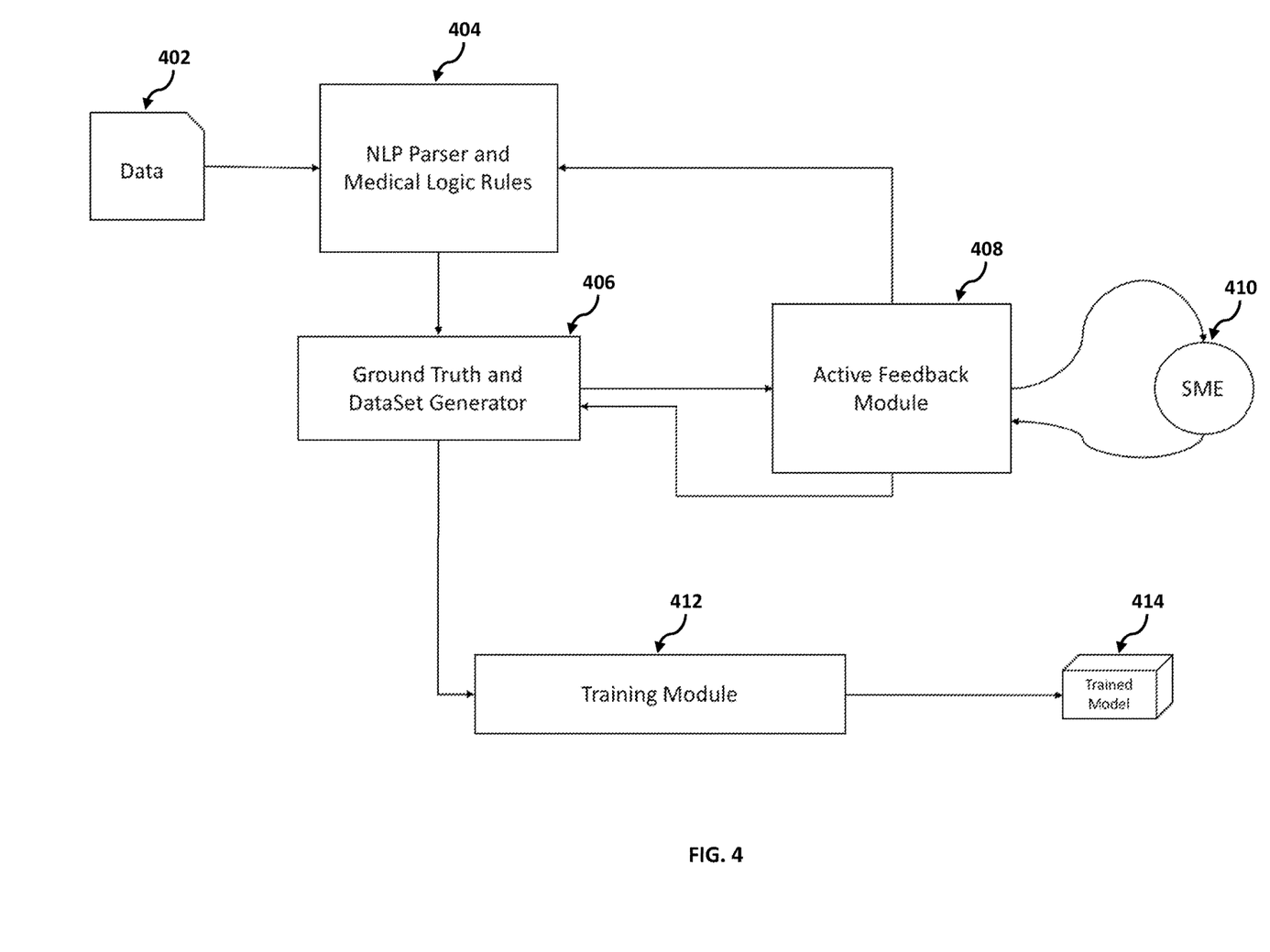
FIG. 4 is block diagram illustrating an overview of active machine learning according to at least one embodiment.

Referring now to FIG. 4, a block diagram illustrating an overview of active machine learning using ground truth used by the active learning program 110a, 110b according to at least one embodiment is depicted.

Data 402 (e.g., medical data stored on a hospital database) may be transmitted to or received by a NLP Parser and Medical Logic Rules Module 404. The NLP Parser and Medical Logic Rules Module may parse concepts and features for a Ground Truth and Dataset Generator 406. The Ground Truth and Dataset Generator 406 may transmit ambiguous concepts and features to an Active Feedback Module 408 that may interact with an SME 410 via interactive rules based dialog with concepts based on medical logic and features. The SME 410 may provide input on each dialog entry.

Next, the Active Feedback Module 408 may transmit the enhanced user input (i.e., SME feedback) to the NLP Parser and Medical Logic Rules Module 404 to re-run the NLP with medical logic. The NLP Parser and Medical Logic Module may again parse the concepts and features for the Ground Truth and Dataset Generator 406 and when the ambiguous concepts and features are no longer present, the weighted ground truth dataset may be transmitted to a Training Module 412 to create a Trained Model 414.

It may be appreciated that FIGS. 2-4 provides only an illustration of one embodiment and do not imply any limitations with regard to how different embodiments may be implemented. Many modifications to the depicted embodiment(s) may be made based on design and implementation requirements.

Figure 5:
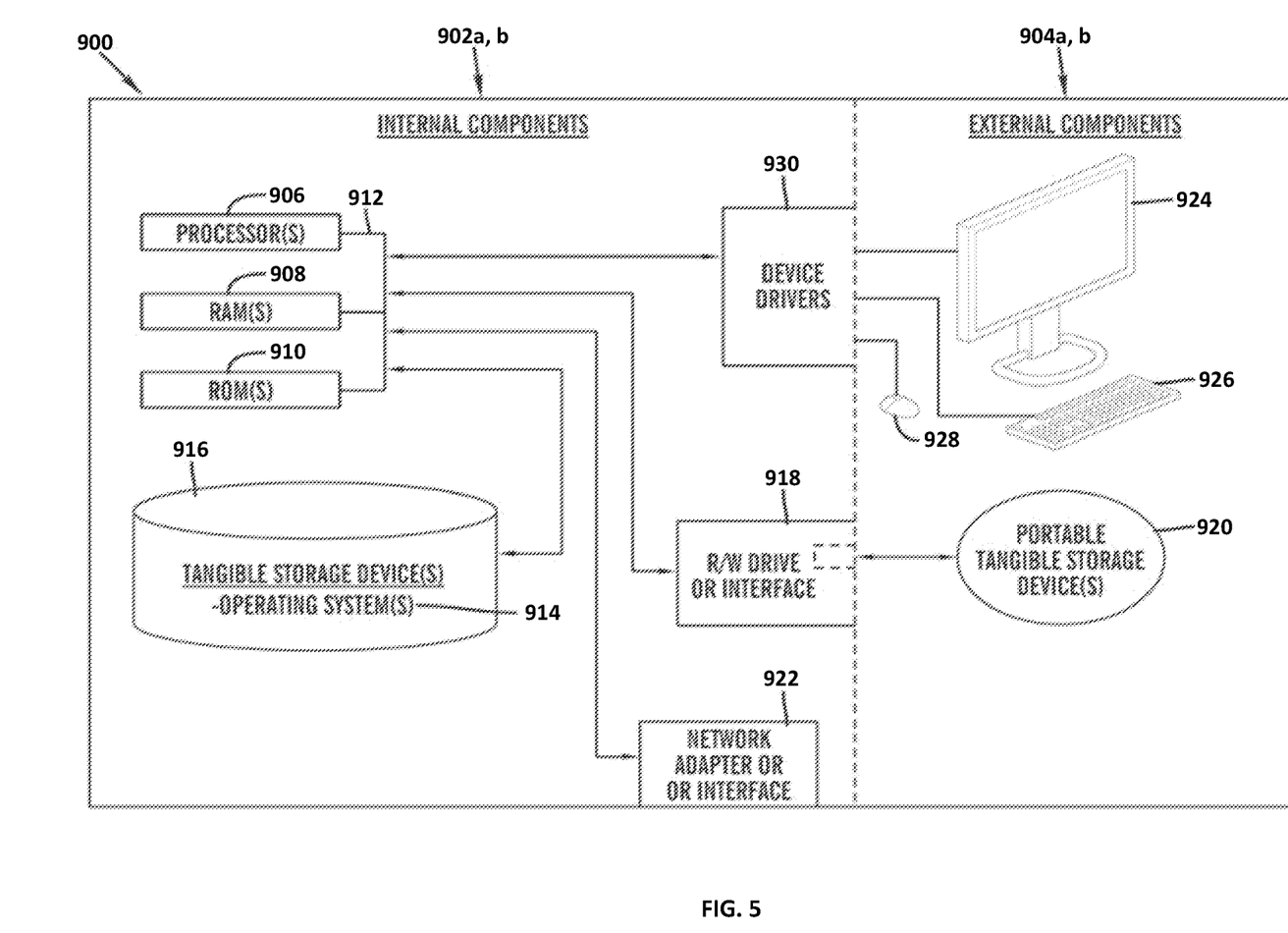
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the active learning program 110a in client computer 102, and the active learning program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the active learning program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the active learning program 110a in client computer 102 and the active learning program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the active learning program 110a in client computer 102 and the active learning program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
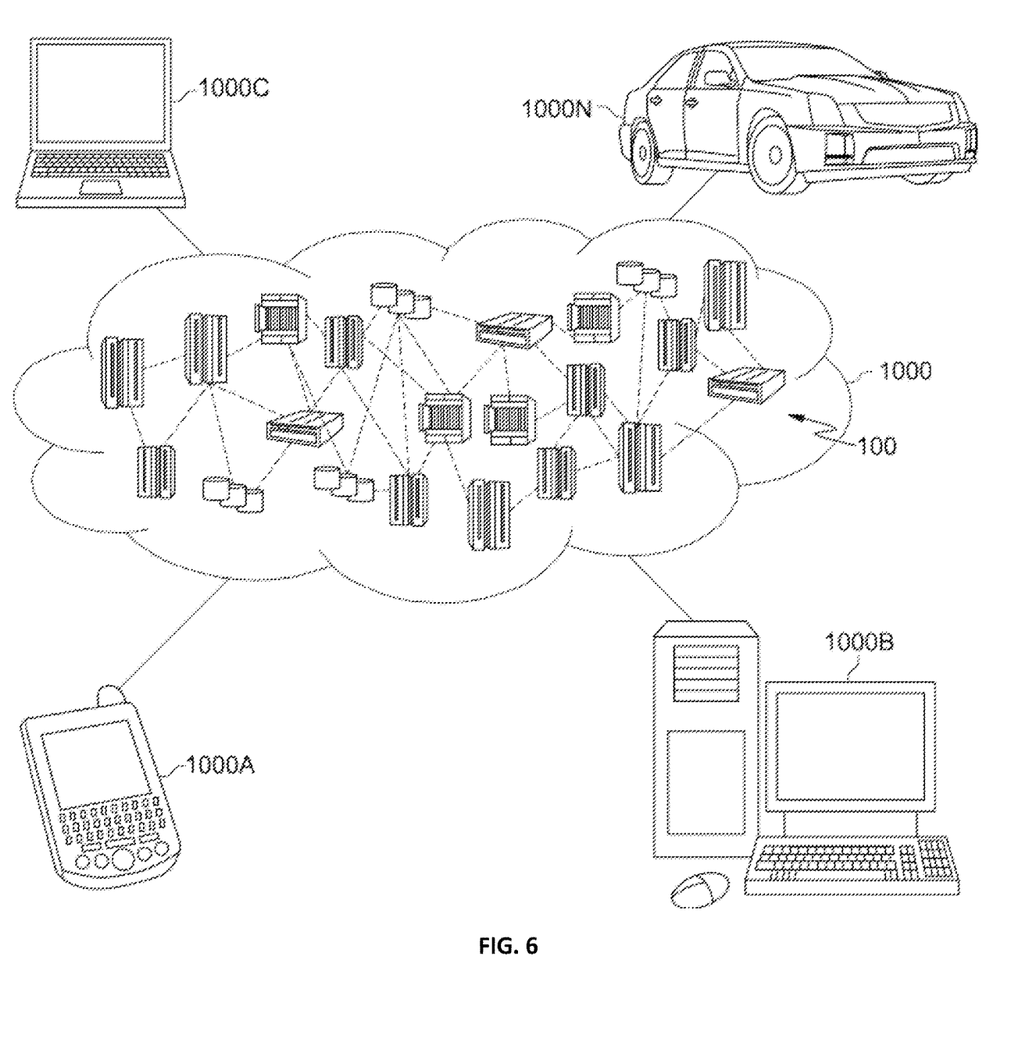
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
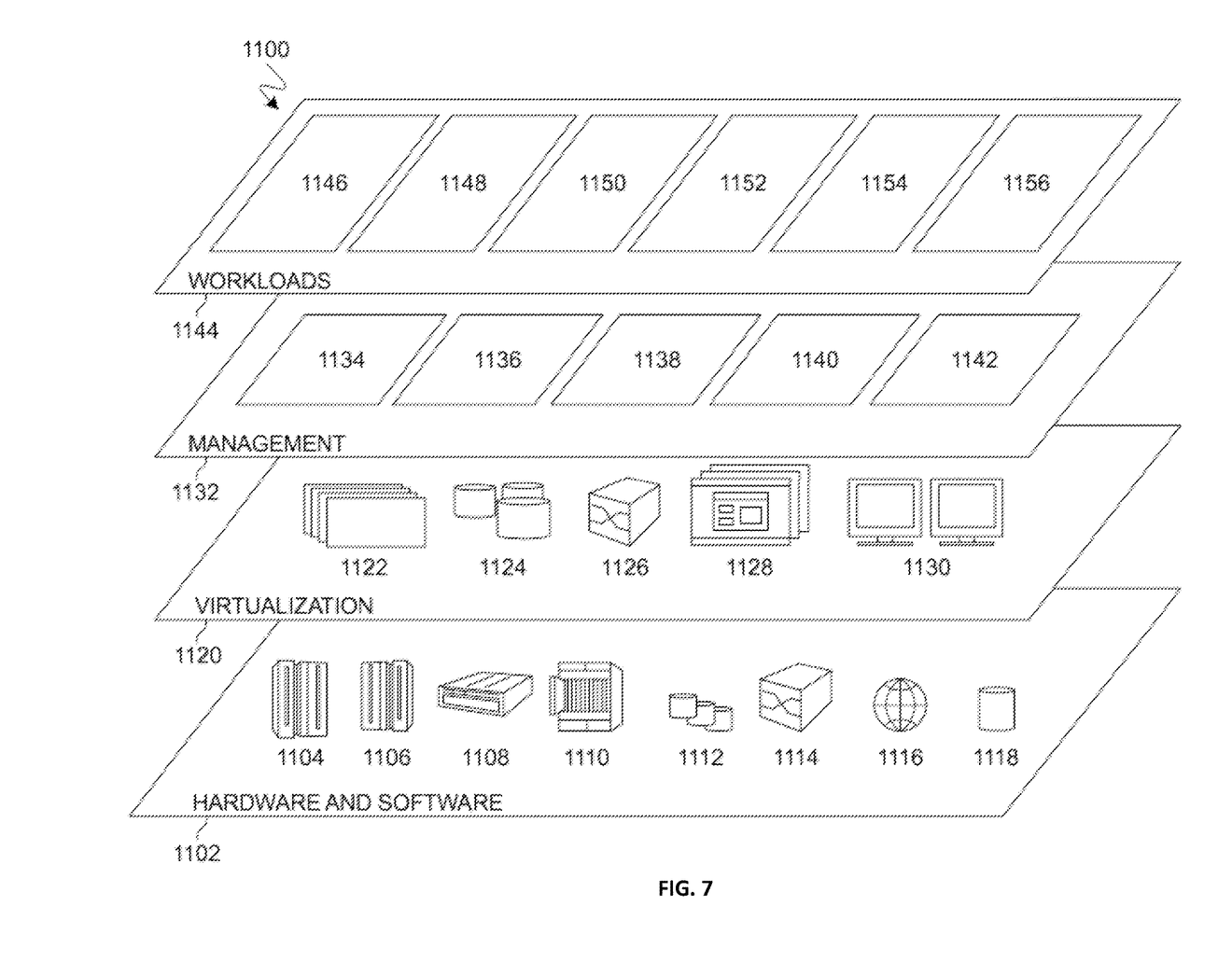
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and active learning 1156. An active learning program 110a, 110b provides a way to use both NLP with evidence-based ground truth input by a user to continually offer a feedback loop to increase the accuracy of data through machine learning.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating ground truth using active machine learning, the method comprising:
   annotating a plurality of data entries using rule-based natural language processing;
   parsing the plurality of data entries into a first dataset that includes entities, features, and classifications;
   building, using a bootstrap aggregation, the first dataset based on the annotated plurality of data entries using coreference resolution and entity analysis, wherein each row in the first dataset represents an annotation from the annotated plurality of data entries;
   receiving user feedback based on the built first dataset in response to detecting an ambiguity associated with a data entry in the built first dataset, wherein the ambiguity indicates the data entry comprises more than one meaning;
   assigning a plurality of weights to a plurality of data entry subsets;

generating a second weighted dataset that is weighted higher than the first dataset because the second weighted dataset is based on the received user feedback; and transmitting the second weighted dataset to create a trained model.

2. The method of claim 1, wherein the plurality of data entries are derived from a source, and wherein the source is selected from a group consisting of a database, a corpus, a knowledgebase or an individual.

3. The method of claim 1, wherein the second weighted dataset includes the plurality of data entry subsets that create a machine learning model.

4. The method of claim 1, wherein the first dataset is data obtained by a domain specific logic and natural language processing of the plurality of data entries.

5. The method of claim 1, wherein the user feedback is created by a subject matter expert (SME) based on rule-based logic applied to the first dataset.

6. The method of claim 1, wherein the second weighted dataset is ground truth data that include features selected from a group consisting of an ambiguous entity, an entity characteristic, an NLP trigger, an NLP trigger distance, an NLP parse tree characteristic and a plurality of a parts of speech tag.

7. The method of claim 1, wherein the higher weight is a more accurate plurality of data.

8. A computer system for active machine learning, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
annotating a plurality of data entries using rule-based natural language processing;
parsing the plurality of data entries into a first dataset that includes entities, features, and classifications;
building, using a bootstrap aggregation, the first dataset based on the annotated plurality of data entries using coreference resolution and entity analysis, wherein each row in the first dataset represents an annotation from the annotated plurality of data entries;
receiving user feedback based on the built first dataset in response to detecting an ambiguity associated with a data entry in the built first dataset, wherein the ambiguity indicates the data entry comprises more than one meaning;
assigning a plurality of weights to a plurality of data entry subsets;
generating a second weighted dataset that is weighted higher than the first dataset because the second weighted dataset is based on the received user feedback; and
transmitting the second weighted dataset to create a trained model.

9. The computer system of claim 8, wherein the plurality of data entries are derived from a source, and wherein the source is selected from a group consisting of a database, a corpus, a knowledgebase or an individual.

10. The computer system of claim 8, wherein the second weighted dataset includes the plurality of data entry subsets that create a machine learning model.

11. The computer system of claim 8, wherein the first dataset is data obtained by a domain specific logic and natural language processing of the plurality of data entries.

12. The computer system of claim 8, wherein the user feedback is created by a subject matter expert (SME) based on rule-based logic applied to the first dataset.

13. The computer system of claim 8, wherein the second weighted dataset is ground truth data that include features selected from a group consisting of an ambiguous entity, an entity characteristic, an NLP trigger, an NLP trigger distance, an NLP parse tree characteristic and a plurality of a parts of speech tag.

14. The computer system of claim 8, wherein the higher weight is a more accurate plurality of data.

15. A computer program product for active machine learning, comprising:
one or more computer-readable tangible storage media and program instructions stored on at least one of the one or more computer-readable tangible storage media, the program instructions executable by a processor to cause the processor to perform a method comprising:
annotating a plurality of data entries using rule-based natural language processing;
parsing the plurality of data entries into a first dataset that includes entities, features, and classifications;
building, using a bootstrap aggregation, the first dataset based on the annotated plurality of data entries using coreference resolution and entity analysis, wherein each row in the first dataset represents an annotation from the annotated plurality of data entries;
receiving user feedback based on the built first dataset in response to detecting an ambiguity associated with a data entry in the built first dataset, wherein the ambiguity indicates the data entry comprises more than one meaning;
assigning a plurality of weights to a plurality of data entry subsets;
generating a second weighted dataset that is weighted higher than the first dataset because the second weighted dataset is based on the received user feedback; and
transmitting the second weighted dataset to create a trained model.

16. The computer program product of claim 15, wherein the plurality of data entries are derived from a source, and wherein the source is selected from a group consisting of a database, a corpus, a knowledgebase or an individual.

17. The computer program product of claim 15, wherein the second weighted dataset includes the plurality of data entry subsets that create a machine learning model.

18. The computer program product of claim 15, wherein the first dataset is data obtained by a domain specific logic and natural language processing of the plurality of data entries.

19. The computer program product of claim 15, wherein the user feedback is created by a subject matter expert (SME) based on rule-based logic applied to the first dataset.

20. The computer program product of claim 15, wherein the second weighted dataset is ground truth data that include features selected from a group consisting of an ambiguous entity, an entity characteristic, an NLP trigger, an NLP trigger distance, an NLP parse tree characteristic and a plurality of a parts of speech tag.

* * * * *